United States Patent
Dumaine et al.

(10) Patent No.: US 10,044,865 B2
(45) Date of Patent: Aug. 7, 2018

(54) TECHNOLOGIES FOR MONITORING INTERACTION BETWEEN CUSTOMERS AND AGENTS USING SENTIMENT DETECTION

(71) Applicant: Interactive Intelligence Group, Inc., Indianapolis, IN (US)

(72) Inventors: Alexander G. Dumaine, Durham, NC (US); Richard J. Walsh, Durham, NC (US)

( * ) Notice: Subject to any disclaimer, the term of this patent is extended or adjusted under 35 U.S.C. 154(b) by 0 days.

(21) Appl. No.: 15/612,919

(22) Filed: Jun. 2, 2017

(65) Prior Publication Data

US 2017/0353605 A1     Dec. 7, 2017

Related U.S. Application Data

(60) Provisional application No. 62/344,734, filed on Jun. 2, 2016.

(51) Int. Cl.
| | |
|---|---|
| *H04M 3/52* | (2006.01) |
| *H04M 3/523* | (2006.01) |
| *G06Q 10/06* | (2012.01) |
| *G06Q 30/00* | (2012.01) |
| *G06K 9/00* | (2006.01) |
| *G06K 9/62* | (2006.01) |
| *H04N 7/14* | (2006.01) |
| *H04M 3/51* | (2006.01) |

(52) U.S. Cl.
CPC ...... *H04M 3/5232* (2013.01); *G06K 9/00268* (2013.01); *G06K 9/00315* (2013.01); *G06K 9/6267* (2013.01); *G06Q 10/063112* (2013.01); *G06Q 30/016* (2013.01); *H04M 3/5183* (2013.01); *H04N 7/147* (2013.01)

(58) Field of Classification Search
USPC ....................................... 348/14.11
See application file for complete search history.

(56) References Cited

U.S. PATENT DOCUMENTS

| | | | |
|---|---|---|---|
| 5,914,951 A | 6/1999 | Bentley et al. | |
| 8,130,935 B1 * | 3/2012 | Coughlan | H04M 3/5232 379/265.02 |

(Continued)

OTHER PUBLICATIONS

International Searching Authority, International Search Report for PCT/US2017/035811, dated Aug. 16, 2017.

(Continued)

*Primary Examiner* — Amal Zenati (57) ABSTRACT

Technologies for monitoring interactions between customers and agents include an interaction management computing device communicatively coupling a customer computing device and an agent computing device to facilitate a support call interaction. The interaction management computing device is configured to receive a video call from a customer and perform a facial recognition analysis of the customer based on images of the customer received with the video call. Additionally, the interaction management computing device is configured to determine a probable emotional state of the customer as a function of the facial recognition analysis of the customer and insert the video call into a service queue as a function of the probable emotional state of the customer. Additional embodiments are described herein.

18 Claims, 6 Drawing Sheets

(56) References Cited

U.S. PATENT DOCUMENTS

| | | | |
|---|---|---|---|
| 2007/0160054 A1 | 7/2007 | Shaffer et al. | |
| 2010/0332287 A1 | 12/2010 | Gates et al. | |
| 2011/0208522 A1 | 8/2011 | Pereg et al. | |
| 2015/0358463 A1* | 12/2015 | O'Connor | H04M 3/5166 |
| | | | 379/88.02 |
| 2016/0133274 A1* | 5/2016 | Conway | G06K 9/00302 |
| | | | 704/246 |

OTHER PUBLICATIONS

International Searching Authority, Written Opinion of the International Searching Authority for PCT/US2017/035811, dated Aug. 16, 2017.

* cited by examiner

TECHNOLOGIES FOR MONITORING INTERACTION BETWEEN CUSTOMERS AND AGENTS USING SENTIMENT DETECTION

CROSS REFERENCE TO RELATED APPLICATIONS

The present application is related to, and claims the priority benefit of, U.S. Provisional Patent Application Ser. No. 62/344,734 filed Jun. 2, 2016, the contents of which are hereby incorporated in their entirety into the present disclosure.

BACKGROUND OF THE DISCLOSED EMBODIMENTS

Nearly every goods and services provider offers some degree of support to those customers who buy or user their products and/or services. Support can come in many forms using various mediums, such as a phone call, video chat, email, a messenger service, etc. Having a respectable customer support system can play an integral role in building/maintaining a company's brand. As such, companies often go to great lengths to ensure their customer's support needs are met.

To do so, they often review metrics associated with the calls received over a particular duration of time. For example, such metrics may include how many calls of which type were received over a particular time, how many of those calls were escalated to a supervisor, etc. However, such historical analysis does not provide real-time feedback and oftentimes context of the interaction between the company's agent (i.e., the customer service representative) and the customer is lost. Accordingly, there exists a need for improvements in technologies for monitoring interactions between customers and agents.

SUMMARY OF THE DISCLOSED EMBODIMENTS

In one aspect, a method for monitoring interactions between customers and agents using sentiment detection includes receiving, by an interaction management computing device, a video call from a customer; performing, by the interaction management computing device, a facial recognition analysis of the customer based on images of the customer received with the video call; determining, by the interaction management computing device, a probable emotional state of the customer as a function of the facial recognition analysis of the customer; and inserting, by the interaction management computing device, the video call into a service queue as a function of the probable emotional state of the customer.

In some embodiments, the method further includes identifying, by the interaction management computing device, one or more facial features of the customer as a function of the facial recognition analysis of the customer; and determining, by the interaction management computing device, a classification of the customer as a function of the identified one or more facial features, wherein determining the probable emotional state of the customer comprises determining the probable emotional state of the customer as a function of the classification of the customer.

In some embodiments, the method further includes performing, by the interaction management computing device and subsequent to a determination that an agent is available to receive the video call inserted into the service queue, a facial recognition analysis of an agent based on images of a video stream captured of the agent; determining, by the interaction management computing device, a present emotional state of the agent as a function of the facial recognition analysis of the agent; determining, by the interaction management computing device, whether to transfer the video call to the agent as a function of the present emotional state of the agent.

In some embodiments, determining whether to transfer the video call to the agent is further determined as a function of the probable emotional state of the customer. In other embodiments, the method further includes retrieving, by the interaction management computing device, a customer interaction profile of the customer, wherein determining whether to transfer the video call to the agent is further determined as a function of the historical information included in the customer interaction profile of the customer.

In some embodiments, the method further includes transferring, by the interaction management computing device, the video call from the service queue to an agent; monitoring, by the interaction management computing device, an interaction between the customer and the agent; and determining, by the interaction management computing device, one or more sentiment scores as a function of the monitored interaction between the customer and the agent. In other embodiments, the method further includes determining, by the interaction management computing device, an updated emotional state of the customer as a function of the facial recognition analysis; and updating, by the interaction management computing device, one or more of the sentiment scores as a function of the updated emotional state of the customer.

In some embodiments, the method further includes providing, by the interaction management computing device, feedback to the agent as a function of the one or more of the sentiment scores, wherein the feedback is indicative of a present emotional state of the customer or the agent. In other embodiments, providing the feedback to the agent comprises providing a visual indicator usable by the agent to perform an action, wherein the action includes at least one of changing an emotional state of the agent and escalating the call to a supervisor. In still other embodiments, the sentiment scores include an interaction score, an agent happiness score, and a customer happiness score.

In another aspect, an interaction management computing device for monitoring interactions between customers and agents includes one or more computer-readable medium comprising instructions; and one or more processors coupled with the one or more computer-readable medium and configured to execute the instructions to receive a video call from a customer; perform a facial recognition analysis of the customer based on images of the customer received with the video call; determine a probable emotional state of the customer as a function of the facial recognition analysis of the customer; and insert the video call into a service queue as a function of the probable emotional state of the customer.

In some embodiments, the one or more processors are further configured to execute the instructions to identify one or more facial features of the customer as a function of the facial recognition analysis of the customer; and determine a classification of the customer as a function of the identified one or more facial features, wherein to determine the probable emotional state of the customer comprises to determine the probable emotional state of the customer as a function of the classification of the customer.

In some embodiments, the one or more processors are further configured to execute the instructions to perform, subsequent to a determination that an agent is available to receive the video call inserted into the service queue, a facial recognition analysis of an agent based on images of a video stream captured of the agent; determine a present emotional state of the agent as a function of the facial recognition analysis of the agent; determine whether to transfer the video call to the agent as a function of the present emotional state of the agent. In other embodiments, determine whether to transfer the video call to the agent is further determined as a function of the probable emotional state of the customer.

In some embodiments, the one or more processors are further configured to execute the instructions to retrieve a customer interaction profile of the customer, wherein to determine whether to transfer the video call to the agent is further determined as a function of the historical information included in the customer interaction profile of the customer.

In some embodiments, the one or more processors are further configured to execute the instructions to transfer the video call from the service queue to an agent; monitor an interaction between the customer and the agent; and determine one or more sentiment scores as a function of the monitored interaction between the customer and the agent. In other embodiments, the one or more processors are further configured to execute the instructions to determine an updated emotional state of the customer as a function of the facial recognition analysis; and update one or more of the sentiment scores as a function of the updated emotional state of the customer.

In some embodiments, the one or more processors are further configured to execute the instructions to provide feedback to the agent as a function of the one or more of the sentiment scores, wherein the feedback is indicative of a present emotional state of the customer or the agent. In other embodiments, to provide the feedback to the agent comprises to provide a visual indicator usable by the agent to perform an action, wherein the action includes at least one of changing an emotional state of the agent and escalating the call to a supervisor. In still other embodiments, the sentiment scores include an interaction score, an agent happiness score, and a customer happiness score.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
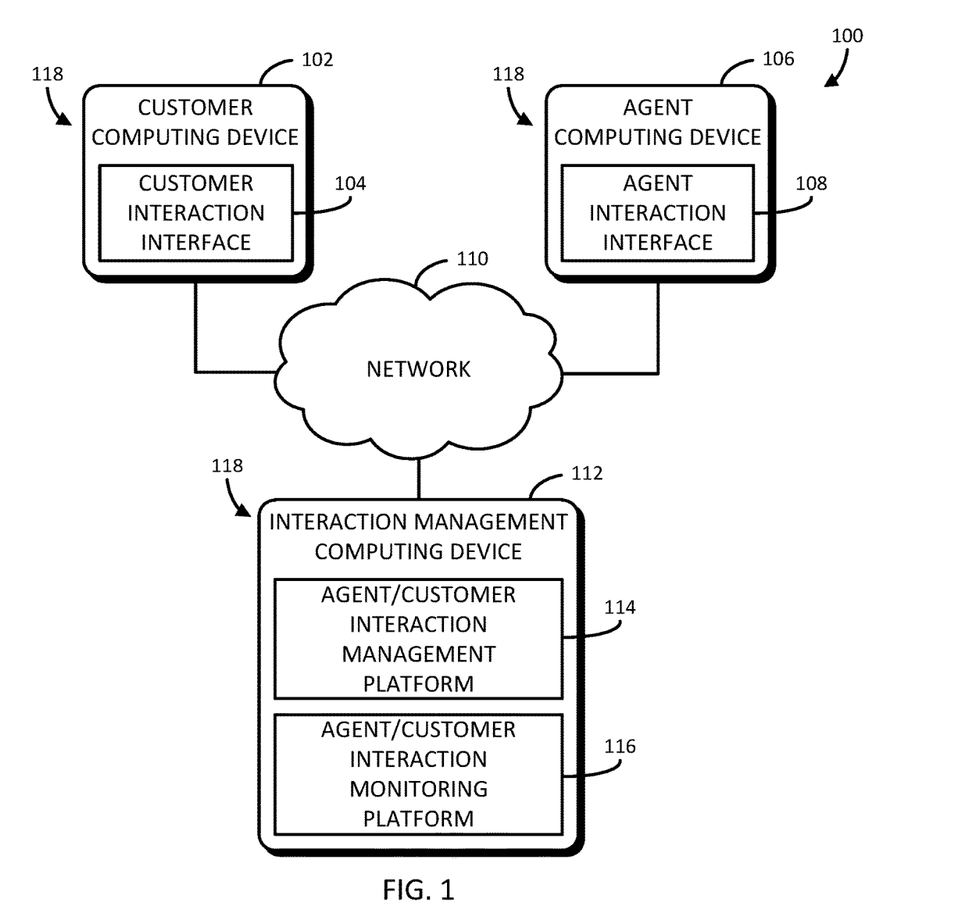
FIG. 1 is a simplified block diagram of at least one embodiment of a system for monitoring interactions between customers and agents using sentiment detection that includes a customer computing device, an agent computing device, and an interaction management computing device.

FIG. 1 is an illustrative system 100 for monitoring interactions between customers and agents using sentiment detection that includes a customer computing device 102, an agent computing device 106, and an interaction management computing device 112. In an illustrative example, a customer contacts a good and/or service provider's support agent (e.g., a customer service representative) via a computing device with video calling capabilities. Accordingly, it should be appreciated that the agent can both see and hear the customer (e.g., via the agent interaction interface 108 of the agent computing device 106) the customer can both see and hear the agent (e.g., via the customer interaction interface 104 of the customer computing device 102) during the support call. It should be appreciated that, in alternative embodiments, the video may be a one-way video such that either the agent can see the customer or the customer can see the agent.

In furtherance of the illustrative example, the system 100 may comprise a unified communications and collaboration (UCC) system. In use, as described in further detail below, the interaction management computing device 112 is configured to manage the interaction between the consumer and the agent (e.g., via the agent/consumer interaction management platform 114). To do so, the interaction management computing device 112 is configured to intake support calls, identify a service queue for each call, and transfer each call to an agent from the respective service queues and certain calls from the agent to a supervisor.

Additionally, as will also be described in further detail below, the interaction management computing device 112 is configured to analyze the interactions of both the agent and the customer throughout a call using sentiment detection/analysis technologies. Such interactions may include any interaction or behavior usable to identify a present emotional state of the customer and the agent. Such technologies may include facial recognition technologies (e.g., usable to detect smiling, frowning, scowling, etc.), speech recognition technologies (e.g., usable to detect inflections, terms, words, utterances, volume, etc.), physical gesture recognition technologies (e.g., usable to detect head movements, hand gestures, etc.), and/or the like. It should be appreciated that, in some embodiments, one or more additional biometrics may be used to identify the present emotional state, such as behavioral biometrics and/or other biometrics which may be detected via a sensor (e.g., blood pressure, heart rate, perspiration level, etc.).

The interaction management computing device 112 is further configured to continue to manage one or more sentiment scores usable to identify the state of the call at any given time. Accordingly, an action may be taken as a result of the determined states. It should be appreciated that the action may be taken in real-time (e.g., such as escalating the call to a supervisor based on the state of the consumer, providing feedback to the agent as to the identified state of the consumer and/or agent, etc.) during the call, or subsequent to the call (e.g., transmitting a particular customer to the agent as a function of the present emotional state of the customer and/or agent, the time of day, the day of the week, etc.).

As illustratively shown, each of the customer computing device 102 and agent computing device 106 include a respective interaction interface (i.e., the customer interaction interface 104 and the agent interaction interface 108, respectively). Accordingly, a customer may use the customer interaction interface 104 to interact with an agent, who in turn may use the agent interaction interface 108 to interact with the client. To enable such interactions (i.e., over the network 110), the customer interaction interface 104 and the agent interaction interface 108 are configured to communicate with the interaction management computing device 112.

In other words, the customer interaction interface 104 and the agent interaction interface 108 serve as software-based interfaces between a consumer (e.g., via a graphical user interface (GUI) of the customer interaction interface 104) and the agent (e.g., via a GUI of the agent interaction interface 108), which are managed by the interaction management computing device 112. In some embodiments, the customer interaction interface 104 and/or the agent interaction interface 108 may be embodied as a type of network-based software application (e.g., thin/zero client, cloud application, network application, software-as-a-service (SaaS) application, etc.) configured to communicate with the interaction management computing device in a client-server relationship over the network 110.

The network 110 may be implemented as any type of wired and/or wireless network, including a local area network (LAN), a wide area network (WAN), a global network (the Internet), etc. Accordingly, the network 110 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc. It should be appreciated that the customer computing device 102, the agent computing device 106, and the interaction management computing device 112 may use different networks (e.g., LANs, provider networks, etc.) to connect to the backbone of the network 110 such that a number of communication channels can be established therein to enable communications therebetween.

The customer computing device 102, the agent computing device 106, and the interaction management computing device 112 may each be embodied as any type of computing device 118 capable of performing the respective functions described herein. For example, the customer computing device 102 and the agent computing device 106 may be embodied as one or more desktop computers or mobile computing devices (e.g., a smartphone, a wearable, a tablet, a laptop, a notebook, etc.), while the interaction management computing device 112 may be embodied as one or more servers (e.g., stand-alone, rack-mounted, etc.), compute devices, storage devices, and/or combination of compute blades and data storage devices (e.g., of a storage area network (SAN)) in a cloud architected network or data center.

It should be appreciated that, in some embodiments, the customer computing device 102, the agent computing device 106, and/or the interaction management computing device 112 may include more than one computing device 118 (e.g., in a distributed computing architecture), each of which may be usable to perform at least a portion of the functions described herein of the respective computing device 118. For example, in some embodiments, one or more functions of the agent/customer interaction management platform 114 may be executed on one or more computing devices 118, while one or more functions of the agent/customer interaction monitoring platform 116 may be executed on one or more other computing devices 118.

Figure 2:
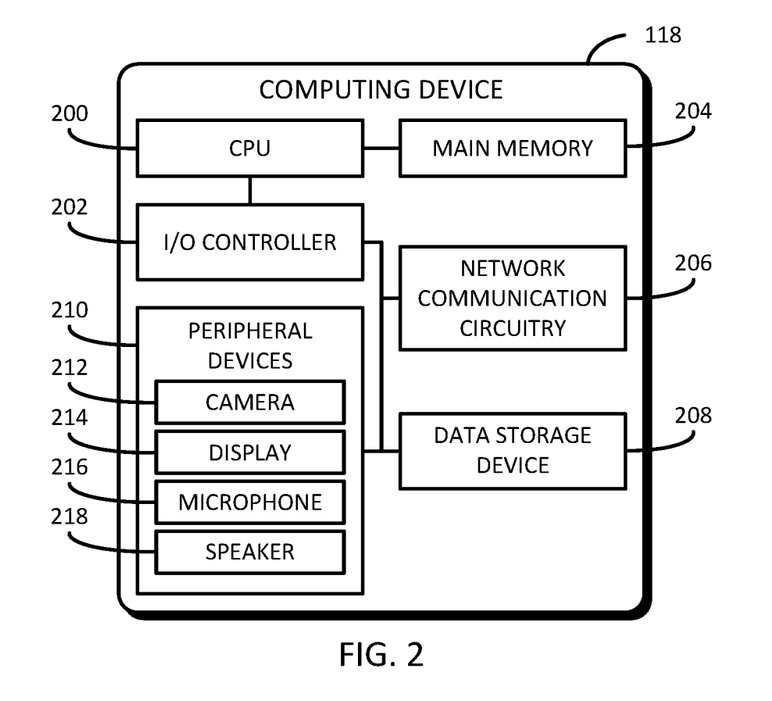
FIG. 2 is a simplified block diagram of at least one embodiment of the customer and agent computing devices of the system of FIG. 1.

Referring now to FIG. 2, an illustrative computing device 118 (e.g., the customer computing device 102, the agent computing device 106, and/or the interaction management computing device 112) includes a central processing unit (CPU) 200, an input/output (I/O) controller 202, a main memory 204, network communication circuitry 206, a data storage device 208, and I/O peripherals 210. In some alternative embodiments, the computing device 118 may include additional, fewer, and/or alternative components to those of the illustrative computing device 118, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the respective computing device 118 may be predicated upon the type and intended use of the respective computing device 118. For example, the interaction management computing device 112 may not include any peripheral devices 210. Additionally, as described previously, the interaction management computing device 112 may be comprised of more than one computing device 118. Accordingly, in such embodiments, it should be further appreciated that one or more computing devices 118 of the interaction management computing device 112 may be configured as a database server with less compute capacity and more storage capacity relative to another of the computing devices 118 of the interaction management computing device 112. Similarly, one or more other computing devices 118 of the interaction management computing device 112 may be configured as an application server with more compute capacity relative and less storage capacity relative to another of the computing devices 118 of the interaction management computing device 112.

The CPU 200, or processor, may be embodied as any combination of hardware and circuitry capable of processing data. In some embodiments, the computing device 118 may include more than one CPU 200. Depending on the embodiment, the CPU 200 may include one processing core (not shown), such as in a single-core processor architecture, or multiple processing cores, such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 118. Illustratively, the I/O controller 202 is configured to receive input/output requests from the CPU 200, and send control signals to the respective input/output devices, thereby managing the data flow to/from the computing device 118.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 118 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 118 to a computer network, as well as other devices, depending on the embodiment.

The data storage device 208 may be embodied as any type of computer hardware capable of the non-volatile storage of data (e.g., semiconductor storage media, magnetic storage media, optical storage media, etc.). Such data storage devices 208 are commonly referred to as auxiliary or secondary storage, and are typically used to store a large amount of data relative to the memory 204 described above.

Each of the I/O peripherals 210 may be embodied as any type of auxiliary device configured to connect to and communicate with the computing device 118. As illustratively shown, the I/O peripherals 210 include a camera 212, a display 212, a microphone 214, and a speaker 216. However, it should be appreciated that the I/O peripherals 210 may include additional and/or alternative I/O devices, such as, but not limited to, a mouse, a keyboard, a touchscreen, a printer, a scanner, etc. Accordingly, it should be appreciated that some I/O devices are capable of one function (i.e., input or output), or both functions (i.e., input and output).

In some embodiments, the I/O peripherals 210 may be connected to the computing device 118 via a cable (e.g., a ribbon cable, a wire, a universal serial bus (USB) cable, a high-definition multimedia interface (HDMI) cable, etc.) connected to a corresponding port (not shown) of the computing device 118 through which the communications made therebetween can be managed by the I/O controller 202. In alternative embodiments, the I/O peripherals 210 may be connected to the computing device 118 via a wireless mode of communication (e.g., Bluetooth®, Wi-Fi®, etc.) which may be managed by the network communication circuitry 206.

Figure 3:
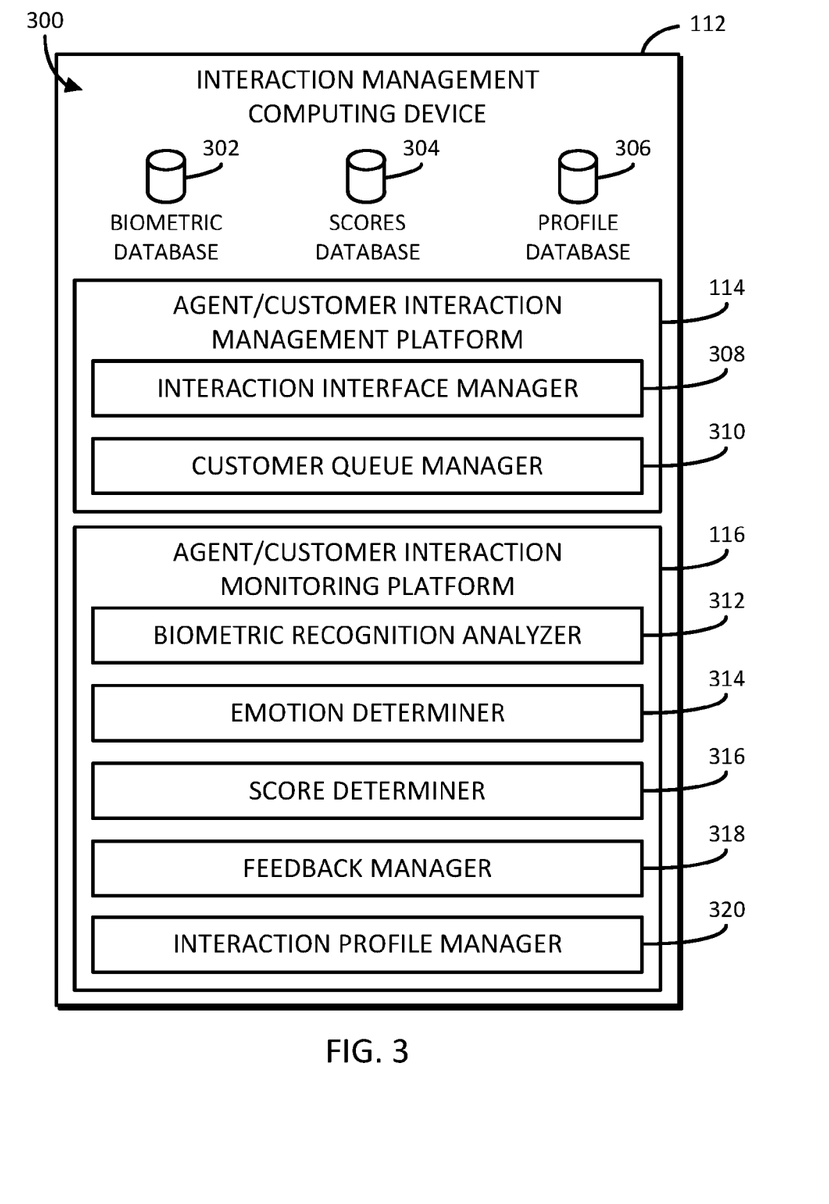
FIG. 3 is a simplified block diagram of at least one embodiment of an environment of the interaction management computing device of the system of FIG. 1.

Referring now to FIG. 3, an illustrative environment 300 of the interaction management computing device 112 is shown. As described previously in FIG. 1, the interaction management computing device 112 includes an agent/customer interaction management platform 114 and an agent/customer interaction monitoring platform 116, each of which may be embodied as any combination of hardware, firmware, software, or circuitry usable to perform the functions described herein. In some embodiments, the agent/customer interaction management platform 114 and the agent/customer interaction monitoring platform 116 may include one or more computer-readable medium (e.g., the memory 204, the data storage device 208, and/or any other media storage device) having instructions stored thereon and one or more processors (e.g., the CPU 200) coupled with the one or more computer-readable medium and configured to execute instructions to perform the functions described herein.

The illustrative environment 300 includes an biometric database 302, a scores database 304, and a profile database 306. While the biometric database 302, the scores database 304, and the profile database 306 are illustratively shown as residing on the interaction management computing device 112, it should be appreciated that, in some embodiments, one or more of the biometric database 302, the scores database 304, and the profile database 306 may be located remote of the interaction management computing device 112 (i.e., on different computing devices 118).

It should be appreciate that, in some embodiments, access to the data provided to and/or generated as described herein may require authorization and/or that such data be encrypted while in storage and/or transit. Accordingly, in some embodiments, one or more authentication and/or encryption technologies known to those of skill in the art may be employed to ensure the storage and access to the data complies with any legal and/or contractual requirements. It should be further appreciated that, in some embodiments, the data stored in the respective databases may not be mutually exclusive. In other words, certain data described herein as being stored in one database may additionally or alternatively be stored in another database described herein, or another database altogether. It should be further appreciated that, in some embodiments, the data may be stored in a single database, or an alternative database / data storage arrangement.

The illustrative agent/customer interaction management platform 114 includes an interaction interface manager 308 and a customer queue manager 310, each of which may be embodied as any type of firmware, hardware, software, circuitry, or combination thereof that is configured to perform the functions described herein. The interaction interface manager 308 is configured to manage the communications and user interfaces associated with the customer interaction interface 104 and the agent interaction interface 108. To do so, in some embodiments, the interaction interface manager 308 may be configured to present a set of customer-centric settings and interfaces in the customer interaction interface 104 and a different set of agent-centric settings and interfaces in the agent interaction interface 108. Additionally, the interaction interface manager 308 may be configured to establish and manage the communication channels, and the communication traffic, between the customer interaction interface 104 and the agent interaction interface 108 (i.e., via the network 110).

The customer queue manager 310 is configured to manage the inbound customer call queues. To do so, the customer queue manager 310 is configured to establish one or more queues in which calls can be placed, place the calls into the respective queue(s), and transfer the calls from the queue(s) to the appropriate agents. In some embodiments, the placement of a call into a certain one or more queues may be based on one or more requirements associated with that respective queue, such as a support type (e.g., customer service, billing, tech support, etc.), a customer, a property of a customer interaction profile associated with the customer, a number of available agents, etc.

The illustrative agent/customer interaction monitoring platform 116 includes a biometric recognition analyzer 312, an emotion determiner 314, a score determiner 316, a feedback manager 318, and an interaction profile manager 320. Each of the biometric recognition analyzer 312, the emotion determiner 314, the score determiner 316, the feedback manager 318, and the interaction profile manager 320 may be embodied as any type of firmware, hardware, software, circuitry, or combination thereof that is configured to perform the functions described herein. It should be appreciated that, while certain functions of the agent/customer interaction monitoring platform 116 are described herein as being performed by independently operable components, each function may be performed by additional or alternative components in other embodiments.

The biometric recognition analyzer 312 is configured to analyze one or more biometrics of the customer and agent during a support call. It should be appreciated that any known technologies for biometric recognition analysis may be employed by the biometric recognition analyzer 312 to perform the analysis on the respective type(s) of biometrics being analyzed. In an illustrative example, the biometric recognition analyzer 312 is configured to perform a facial recognition analysis to identify facial features from an image such that the identified facial features may be used to determine an expression of emotion (e.g., as may be determined by the emotion determiner 314), a process commonly referred to as emotion recognition. For example, the biometric recognition analyzer 312 is configured to analyze images obtained from a video stream of the customer or agent which are usable to identify emotional states of the customer or agent.

In some embodiments, the biometric recognition analyzer 312 is further configured to perform analysis on speech of the customer and agent. To do so, the biometric recognition analyzer 312 is configured to identify words and phrases spoken by the customer and agent, and translate the identified words and phrases into a machine-readable format. Additionally, in some embodiments, the biometric recognition analyzer 312 may be configured to analyze additional speech characteristics, such as changes in pitch, volume, or tone of a voice. To do so, the biometric recognition analyzer 312 may be configured to analyze an audio stream of the customer or agent, which may be coupled with the video stream of the customer or agent. The translated words and phrases and results of the additional speech characteristics, if applicable, may be stored in the biometric database 302, in some embodiments.

The emotion determiner 314 is configured to determine an emotional state of the customer and/or agent at any given time, in real-time, as a function of the results of a biometric recognition analysis (e.g., as may be performed by the biometric recognition analyzer 312). It should be appreciated that the emotion determiner 314 may use various computational technologies to interpret a human emotion from the results of the biometric recognition analysis, such as, but not limited to, signal processing, machine learning, and computer vision.

The score determiner 316 is configured to determine sentiment scores for the interaction, the agent, and/or the customer. For example, the score determiner 316 may be configured to determine a happiness score for the agent (i.e., an agent happiness score), a happiness score for the customer (i.e., a customer happiness score), and an overall score for the call (i.e., an interaction score). The score determiner 316 is configured to determine the interaction score as a function of the agent happiness score and the customer happiness score. The score determiner 316 is configured to determine the agent happiness score and the customer happiness score as a function of the determined emotion for each respective call attendee (i.e., the customer and agent(s)/supervisor(s)).

The score determiner 316 is additionally configured to update the sentiment scores throughout the call (i.e., at any given time during a call). Accordingly, the score determiner 316 may be configured to determine/update one or more of the sentiment scores at certain intervals during the call and/or based on a detected change. For example, in some embodiments, the score determiner 316 may be configured to determine one or more of the sentiment scores every 30 seconds, every minute, etc. Accordingly, the scoring may be increased/decreased over a duration of time, which may serve to increase/decrease a confidence level of the respective score. In other words, a series of detected emotions in which the customer is consistently exhibiting a particular emotional state may be used to identify a more accurate customer happiness level. As such, it may be determined with a particular level of confidence (e.g., based on a confidence threshold) that the happiness level is a true indication of the customer's emotional state of being (e.g., the customer's level of happiness is increasing, the customer is becoming more irritated, etc.).

Additionally or alternatively, in other embodiments, the score determiner 316 may be configured to determine the happiness score for the agent and/or customer upon receiving an indication that an emotional state of the agent or the customer has changed. In another example, in some embodiments, the score determiner 316 may be configured to determine the interaction score upon a detected emotional state change or happiness score change. The sentiment scores (e.g., agent happiness scores, the customer happiness scores, and the interaction scores) may be stored in the scores database 304, in some embodiments.

The feedback manager 318 is configured to provide feedback to the agent as a function of one or more of the agent happiness score, the customer happiness score, and the interaction score. The feedback may include any type of visual indication (e.g., text, graphical elements, icons, emoticons, etc.) which is usable to interpret one or more of the agent happiness score, the customer happiness score, and the interaction score. Additionally, such feedback may include the nature of the trigger of the feedback, such as a detected facial expression, an uttered phrase, a volume change, etc.

The feedback manager 318 is further configured to provide feedback based on historical interactions prior to the call with the customer, such as relevant information associated with prior interactions the agent or another agent had with a particular issue and/or customer, such that the agent can be better prepared. In an illustrative example, the agent may be shown a listing of with a sentiment representation for each of one or more previous interactions the customer had, which may allow the agent to more quickly understand the caller's recent history.

The feedback manager 318 may be further configured to determine, based on the present customer happiness score, to some degree of confidence, that the customer needs to be escalated to a supervisor. Accordingly, under such conditions, the feedback manager 318 may be configured to provide a visual indication (e.g., via the agent interaction interface 108) that the agent should escalate the call to a supervisor. In another illustrative example, the feedback manager 318 may determine based on the present agent happiness score that the agent is not appearing as cheerful as the employer would like. Under such conditions, the feedback manager 318 may be configured to provide a visual indication (e.g., via the agent interaction interface 108) that the agent should smile.

In some embodiments, the feedback manager 318 may be configured to coordinate with the customer queue manager 310, such that the customer queue manager 310 can manage the customer queue as a function the feedback associated with the feedback being provided to the agent. For example, the feedback manager 318 may provide feedback that indicates the agent is having a difficult time presently, or for the day, and provide an indication of such to the customer queue manager 310. As a result, the customer queue manager 310 may adjust the agent's workload accordingly, such as by reducing the workload or transmitting those customer's whose previous interactions or types of interactions have historically resulted in higher sentiment scores (i.e., anticipated as less frustrating work). In some embodiments, the score determiner 316 may be additionally or alternatively configured to coordinate with the customer queue manager 310 in a similar fashion to that described for the feedback manager 318 (i.e., manage the customer queue as a function of one or more of the sentiment scores).

The interaction profile manager 320 is configured to manage the interaction profiles for the agents (i.e., the agent interaction profiles) and the customers (i.e., the customer interaction profiles). Each interaction profile includes historical data related to the respective call attendees (i.e., the customer and agent(s)/supervisor(s)). For example, the customer interaction profile may include a record of each call in which that customer sought support and interaction information associated with each call. In an illustrative example, such a record may include one or more of an identifier of the type of support being requested, one or more identifiers of the agent(s)/supervisor(s) that assisted on the call, a date/time/duration of the call, one or more customer happiness scores, one or more agent happiness scores, and one or more interaction scores. Similarly, the agent interaction profile may include a record of each call in which the agent provided support and interaction information associated with each call. In an illustrative example, such a record may include one or more of an identifier of the type of support being provided, an identifier of the customer for which assistance was provided on the call, a date/time/duration of the call, one or more sentiment scores (e.g., one or more agent customer happiness scores, one or more agent happiness scores, one or more interaction scores, etc.), and an indication of any feedback provided to the agent during the call.

The interaction profile manager 308 is additionally configured to associate the results of the machine-readable words/phrases, emotion classifications, and results of other analyses performed by the agent/customer interaction monitoring platform 116 with the respective interaction profiles such that a historical analysis may be performed thereon, which may be used to influence future decisions/sentiment scores. In some embodiments, the agent interaction profiles and customer interaction profiles may be stored in the profiles database 306.

Figure 4:
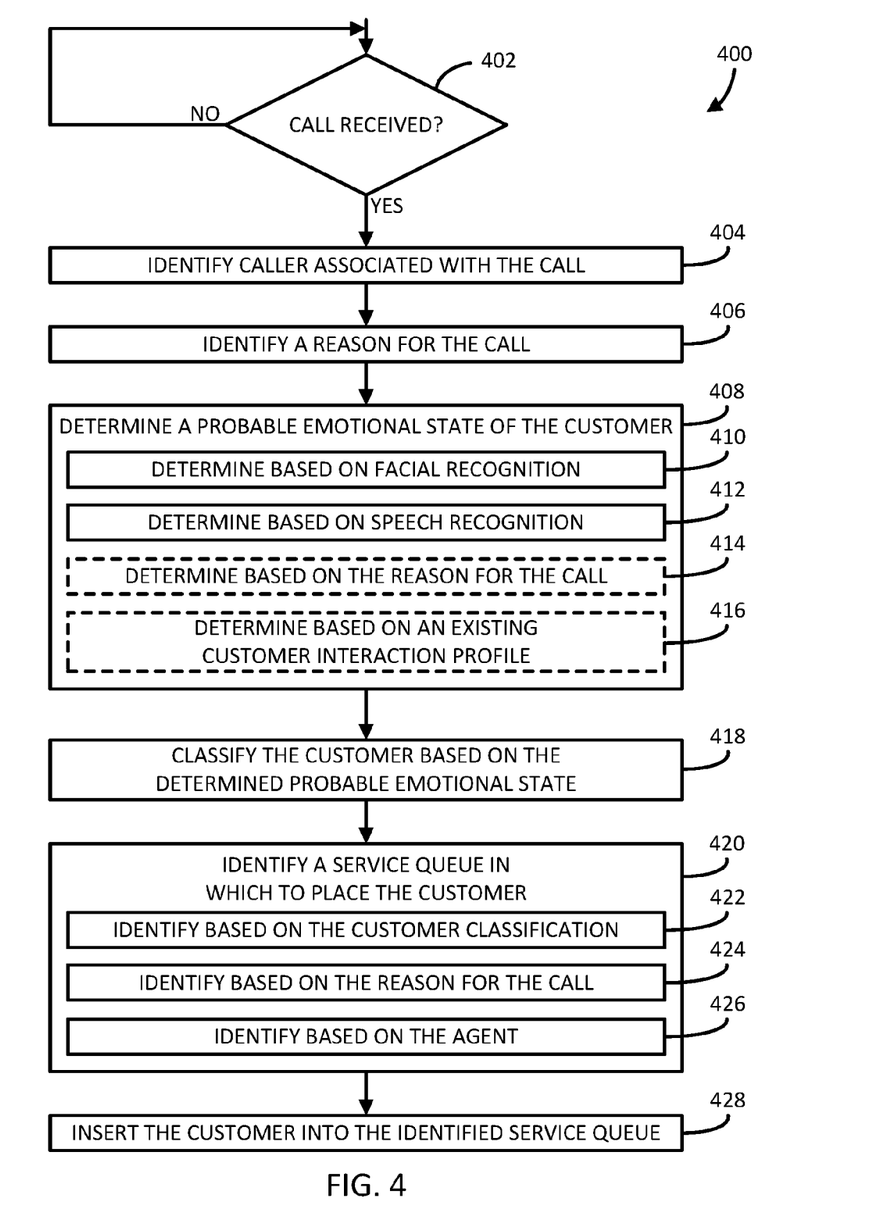
FIG. 4 is a simplified flow diagram of at least one embodiment of a method for inserting a customer into a service queue that may be executed by the interaction management computing device of FIGS. 1 and 3.

Referring now to FIG. 4, an illustrative method 400 is provided for inserting a customer into a service queue which may be executed by the interaction management computing device 112, or more particularly the agent/customer interaction management platform 114 and the agent/customer interaction analysis platform 116 of the interaction management computing device 112. The method 400 begins in block 402, in which the interaction management platform 114 determines whether a call has been received. If a call has been received, the method 400 advances to block 404 in which the interaction management platform 114 identifies the caller associated with the call. For example, the interaction management platform 114 may use one or more unique customer identifiers to determine the caller, such as, but not limited to, a phone number, an address, a pin, an account number, a first/last name, a voice recognition feature, etc. In block 406, the interaction management platform 114 identifies a reason for the call. To do so, in some examples, the interaction management platform 114 may be configured to prompt the customer to verbally communicate or press a button, or a series of buttons, such that a type of support being sought can be identified.

In block 408, the interaction analysis platform 116 determines a probable emotional state of the customer. In block 410, the interaction analysis platform 116 determines the probable emotional state of the customer based at least in part on a facial recognition analysis performed on images of the customer obtained from a video stream of the call which are usable to identify emotional states of the customer. Additionally, in block 412, the interaction analysis platform 116 determines the probable emotional state of the customer based at least in part on a speech recognition analysis performed on the customer's speech from an audio stream of the call which is usable to identify the emotional state of the customer.

Further, in some embodiments, in block 414, the interaction analysis platform 116 determines the probable emotional state of the customer based at least in part on the reason for the call. For example, it may have been previously determined that, on the whole, billing support customers are typically more irritated at the onset of a call than customers seeking technical support assistance. Additionally or alternatively, in those embodiments in which a customer interaction profile exists for the identified caller, in block 416, the interaction analysis platform 116 determines the probable emotional state of the customer based at least in part on a customer interaction profile corresponding to the identified customer.

For example, the interaction analysis platform 116 may determine, based on the information contained in the customer interaction profile, that the caller is likely in a perturbed state, as they have called about the same or similar issue previously and have been escalated to a supervisor each time. It should be appreciated that, in some embodiments, the aforementioned emotional state determination techniques may be weighted in accordance with a level of importance placed respectively thereon, which is usable to determine the customer's probable emotional state.

In block 418, the interaction analysis platform 116 classifies the customer based on the determined probable emotional state. For example, the interaction analysis platform 116 may classify the customer as being happy, neutral, irritated, angry, etc. In another example, the interaction analysis platform 116 may classify the customer according to a numerical identifier. In such embodiments, the interaction analysis platform 116 may assign a numerical value to the customer that is indicative of their probable emotional state. In some embodiments, the numerical value may correspond to a bin that is usable to identify the customer as being some degree of happy, neutral, irritated, angry, etc.

In block 420, the interaction management platform 114 identifies a service queue in which to place the customer. In block 422, the interaction management platform 114 identifies the service queue based at least in part on the customer classification. In block 424, the interaction management platform 114 identifies the service queue based at least in part on the reason for the call. In block 426, the interaction management platform 114 identifies the service queue based the agent, or agents, servicing the respective service queue. In block 428, the interaction management platform 114 inserts the customer into the service queue identified in block 420.

Figure 5:
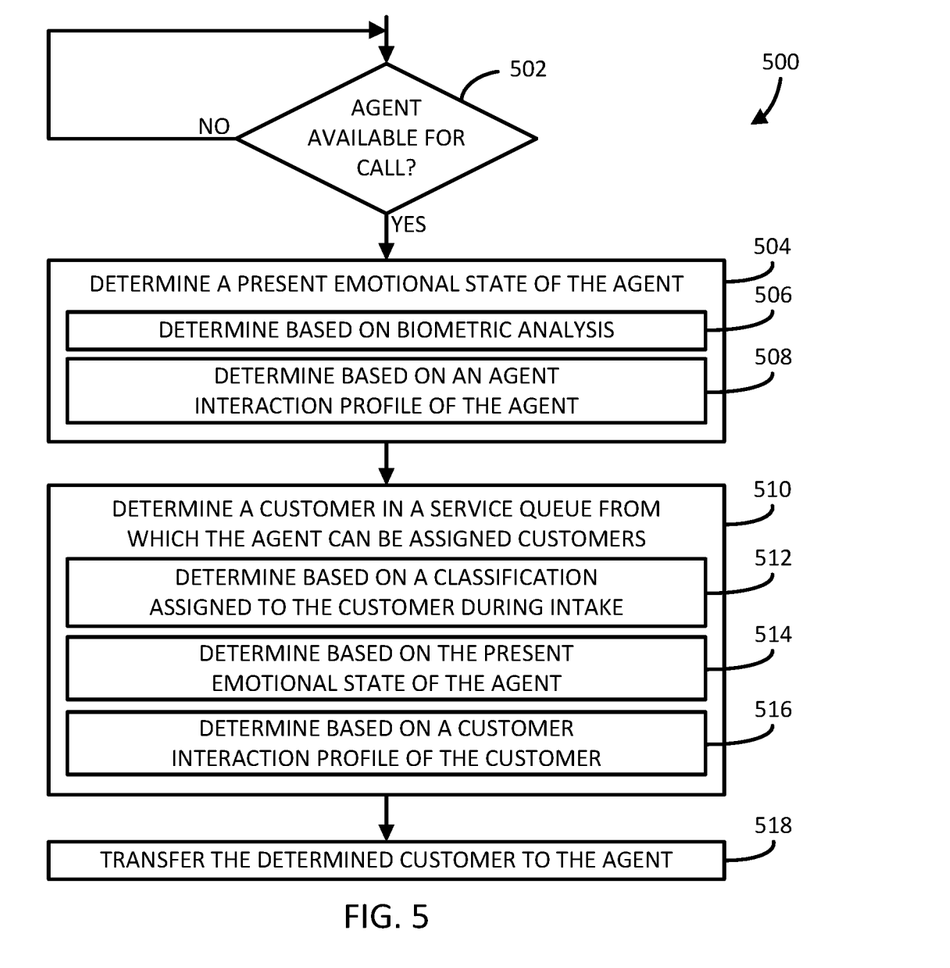
FIG. 5 is a simplified flow diagram of at least one embodiment of a method for assigning a customer from the service queue to an agent that may be executed by the interaction management computing device of FIGS. 1 and 3.

Referring now to FIG. 5, an illustrative method 500 is provided for assigning a customer from the service queue to an agent which may be executed by the interaction management computing device 112, or more particularly the agent/customer interaction management platform 114 and the agent/customer interaction analysis platform 116 of the interaction management computing device 112. The method 500 begins in block 502, in which the interaction management platform 114 determines whether an agent is available for a call. It should be appreciated that the call has been previously placed into a queue for which the agent has been assigned (see, e.g., the method 400 of FIG. 4).

If an agent is available for a call, the method 500 advances to block 504, in which the interaction analysis platform 116 determines a present emotional state of the agent. As described previously, an emotional state may be determined as a function of a facial recognition analysis, a speech recognition analysis, or some other biometric analysis (e.g., blood pressure, heart rate, etc.). Accordingly, in block 506, the interaction analysis platform 116 determines the present emotional state of the agent at least in part based on a biometric analysis of one or more sentiment detecting technologies. To do so, as described previously, the interaction analysis platform 116 is configured to analyze images obtained from a video stream of the agent which are usable to identify emotional states of the agent. In some embodiments, the interaction analysis platform 116 is additionally configured to analyze other biometrics obtained from the agent, such as a heart rate, speech (e.g., such as may be bundled as an audio stream with the video stream of the agent), a blood pressure, etc.

In block 508, the interaction analysis platform 116 determines the present emotional state of the agent based at least in part on information contained in the agent interaction profile corresponding to the agent. As described previously, the agent interaction profile includes historical data of previous calls, such as an identifier of the type of support provided during each call, an identifier of the customer for which assistance was provided on each call, a date/time/duration of each call, one or more sentiment scores (e.g., one or more customer happiness scores for each call, one or more agent happiness scores for each call, one or more interaction scores for each call, etc.), and any feedback provided to the agent during each call.

In an illustrative example, the interaction analysis platform 116 determines the present emotional state of the agent based on information associated with a most recent interaction, such as an average/last happiness score of the customer on the most recent call, an average/last happiness score of the agent on the most recent call, an average/last interaction score associated with the most recent call, any feedback received by the agent during the most recent call, etc. In furtherance of the illustrative example, the interaction analysis platform 116 may additionally or alternatively determine the present emotional state of the agent based on information associated with one or more previous interactions, such as one or more previous interactions between the agent and a customer in the service queue, a historical average of the sentiment scores (e.g., the agent/customer happiness scores) at a particular time of day and/or day of the week, etc.

It should be appreciated that while the service queue may be typically managed as a first in, first out (FIFO) queue, such an approach may not be ideal in all support situations. For example, an agent may have recently been on a call with an extremely irate customer, which has left the agent in a somewhat flustered state, and the next customer in the service queue has a history of being escalated to a supervisor. As such, it may be appropriate to transfer another customer in the queue to the agent. Accordingly, in block 510, the interaction management platform 114 determines which customer presently in a service queue assigned to the agent can be transferred to the agent. It should be further appreciated that more than one agent may be assigned to one or more service queues at any given time, such that the next customer in the service queue can be assigned to another agent, should the instance arise where the next customer in the service queue is skipped in an effort to ensure a more amicable pairing between customer and agent.

In block 510, the interaction management platform 114 determines the customer to assign to the agent based at least in part on the classification assigned to the customer during intake (see, e.g., block 418 of FIG. 4). Additionally or alternatively, in block 512, the interaction management platform 114 determines the customer to assign to the agent based at least in part on the present emotional state of the agent determined in block 504. In such embodiments in which the customer has an existing customer interaction profile, the interaction management platform 114 may, in block 516, determine the customer to assign to the agent based at least in part on information contained in that customer's customer interaction profile. In block 518, the interaction management platform 114 transfers the customer determined in block 510 to the agent.

Figure 6:
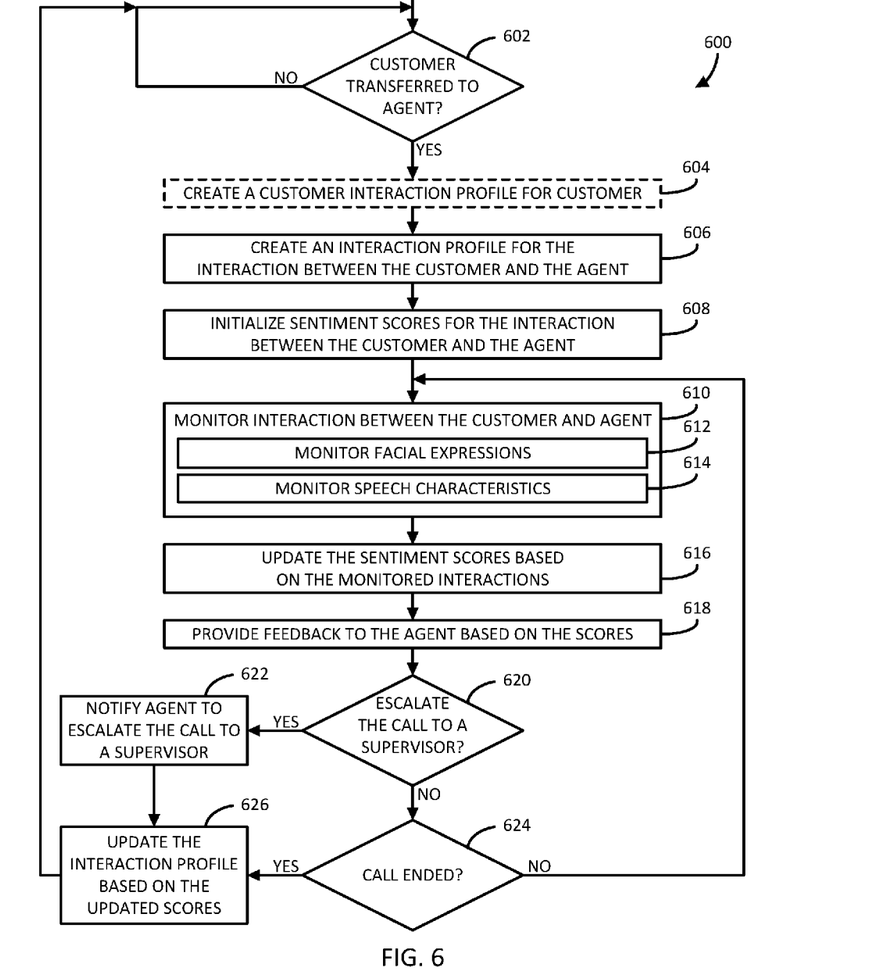
FIG. 6 is a simplified flow diagram of at least one embodiment of a method for monitoring interactions between customers and agents using sentiment detection that may be executed by the interaction management computing device of FIGS. 1 and 3.

Referring now to FIG. 6, an illustrative method 600 is provided for monitoring interactions between customers and agents using sentiment detection which may be executed by the interaction management computing device 112, or more particularly the agent/customer interaction analysis platform 116 of the interaction management computing device 112. The method 600 begins in block 602, in which the interaction analysis platform 116 determines whether a customer has been transferred to an agent (e.g., via the agent/customer interaction management platform 114). If so, the method 600 advances to block 604, in which the interaction analysis platform 116 creates a customer interaction profile for the customer, if one does not presently exist. In block 606, the interaction analysis platform 116 creates an interaction profile in which to store the interaction information collected/determined (e.g., translated speech to text, sentiment scores, feedback, customer/agent/supervisor identifying information, etc.) during the call between the customer and the agent.

In block 608, the interaction analysis platform 116 initializes the sentiment scores for the interaction between the customer and the agent. As described previously, the sentiment scores include a customer happiness score, an agent happiness score, and an interaction score. As also described previously, the customer happiness score corresponds to a determined happiness level of the customer at a given point in time during the call, based on one or more emotional states of the customer identified to that point in time of the call. The agent happiness score, as described previously, corresponds to a determined happiness level of the agent at a given point in time during the call based on one or more emotional states of the agent identified to that point in time of the call. The interaction score, as also described previously, corresponds to a rating of the call at a given point in time during the call as a function of the agent happiness score and the customer happiness score.

In block 610, the interaction analysis platform 116 starts monitoring the interactions between the customer and the agent. To do so, in block 612, the interaction analysis platform 116 monitors facial expressions of both the customer and the agent. Additionally, in block 614, the interaction analysis platform 116 monitors speech characteristics of both the customer and the agent, such as, but not limited to, inflections, terms, phrases, volume, etc. It should be appreciated that additional biometrics may be monitored in other embodiments.

In block 616, the interaction analysis platform 116 updates the interaction score, agent happiness score, and customer happiness score based on the monitored interactions. As described previously, the interaction analysis platform 116 may determine one or more of the sentiment scores at certain intervals during the call and/or based on a detected change, such as every 30 seconds, every minute, etc. As also described previously, the interaction analysis platform 116 may additionally or alternatively determine one or more of the sentiment scores upon detecting an emotional state of the agent or the customer during monitoring.

In block 618, the interaction analysis platform 116 provides feedback to the agent (e.g., via the agent interaction interface 108 of FIG. 1) based on one or more of the interaction score, the agent happiness score, and the customer happiness score. The feedback may include a visual and/or textual representation of a score. In an illustrative example of a visual representation of a score, the feedback may be in the form of one or more graphical elements, icons, emoticons, etc., which correspond to a present emotional state of the corresponding participant on the call. Additionally or alternatively, one or more visual representations of a score may be usable to identify whether one or more of the sentiment scores is within an acceptable range or meets/exceeds an acceptable threshold, such as one or more colors, bars, lines, graphs, etc., or any other such visual indicators usable to identify a present emotional state of the participants on the call. Additionally, the feedback may include an action to be undertaken by the agent, such as to cheer up, attempt to calm the customer, keep up the good work, consider escalating the call to a supervisor, etc. In some embodiments, the feedback may be in the form of a warning, such as a warning that the customer is incoming increasingly more irritated, such that the agent can change tactics before the call is escalated to a supervisor.

In block 620, the interaction analysis platform 116 determines whether to escalate the call to a supervisor. To do so, the interaction analysis platform 116 may determine whether one or more of the sentiment scores has fallen below an acceptable threshold and/or has been at or near the acceptable threshold for a predetermined duration of time. In an illustrative example, if a customer happiness level is indicated by a percentage of happiness and the customer happiness level falls below the acceptable threshold (e.g., 60%, 50%, 33%, etc.), the interaction analysis platform 116 may trigger the call to be escalated to a supervisor. It should be appreciated that, in some embodiments, the acceptable threshold may be a dynamic threshold, such as may be based on historical sentiment scores of the agent and/or customer.

If the interaction analysis platform 116 determines to escalate the call to a supervisor, the method 600 branches to block 622, in which the interaction analysis platform 116 notifies the agent (e.g., via the agent interaction interface 108 of FIG. 1) to notify the customer that the call is being escalated to a supervisor. From block 622, the method 600 advances to block 626, in which the interaction analysis platform 116 updates the interaction profile based on the sentiment scores determined throughout the call, as well as the feedback and any other pertinent information about the interaction. It should be appreciated that the respective agent and customer interaction profiles are also updated with the relevant information pertaining to the respective interaction profile.

Referring back to block 620, if the interaction analysis platform 116 determines not to escalate the call to a supervisor, the method 600 branches to block 624, in which the interaction analysis platform 116 determines whether the call has ended. If not, the method 600 returns to block 610 to continue monitoring the interaction between the customer and the agent; otherwise, the method 600 advances to block 626 to update the interaction profile(s) as described above. It should be appreciated that upon detection of the call having ended at any point in time during the call, the method 600 advances directly to block 626.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for monitoring interactions between customers and agents using sentiment detection, the method comprising:
   receiving, by an interaction management computing device, a video call from a customer;
   performing, by the interaction management computing device, a facial recognition analysis of the customer based on images of the customer received with the video call;
   determining, by the interaction management computing device, a probable emotional state of the customer as a function of the facial recognition analysis of the customer;
   inserting, by the interaction management computing device, the video call into a service queue as a function of the probable emotional state of the customer, wherein the service queue comprises a plurality of video calls;
   identifying, by the interaction management computing device, one or more facial features of the customer as a function of the facial recognition analysis of the customer; and
   determining, by the interaction management computing device, a classification of the customer as a function of the identified one or more facial features,
   wherein determining the probable emotional state of the customer comprises determining the probable emotional state of the customer as a function of the classification of the customer.

2. The method of claim 1, further comprising:
   performing, by the interaction management computing device and subsequent to a determination that an agent is available to receive the video call inserted into the service queue, a facial recognition analysis of an agent based on images of a video stream captured of the agent;

determining, by the interaction management computing device, a present emotional state of the agent as a function of the facial recognition analysis of the agent; and determining, by the interaction management computing device, whether to transfer the video call to the agent as a function of the present emotional state of the agent.

3. The method of claim 2, wherein determining whether to transfer the video call to the agent is further determined as a function of the probable emotional state of the customer.

4. The method of claim 1, further comprising retrieving, by the interaction management computing device, a customer interaction profile of the customer, wherein determining whether to transfer the video call to the agent is further determined as a function of the historical information included in the customer interaction profile of the customer.

5. The method of claim 1, further comprising:

transferring, by the interaction management computing device, the video call from the service queue to an agent;

monitoring, by the interaction management computing device, an interaction between the customer and the agent; and determining, by the interaction management computing device, one or more sentiment scores as a function of the monitored interaction between the customer and the agent.

6. The method of claim 5, further comprising:

determining, by the interaction management computing device, an updated emotional state of the customer as a function of the facial recognition analysis; and updating, by the interaction management computing device, one or more of the sentiment scores as a function of the updated emotional state of the customer.

7. The method of claim 5, further comprising providing, by the interaction management computing device, feedback to the agent as a function of the one or more of the sentiment scores, wherein the feedback is indicative of a present emotional state of the customer or the agent.

8. The method of claim 7, wherein providing the feedback to the agent comprises providing a visual indicator usable by the agent to perform an action, wherein the action includes at least one of changing an emotional state of the agent and escalating the call to a supervisor.

9. The method of claim 5, wherein the sentiment scores include an interaction score, an agent happiness score, and a customer happiness score.

10. An interaction management computing device for monitoring interactions between customers and agents, the interaction management computing device comprising:

one or more computer-readable medium comprising instructions; and one or more processors coupled with the one or more computer-readable medium and configured to execute the instructions to:

receive a video call from a customer;

perform a facial recognition analysis of the customer based on images of the customer received with the video call;

determine a probable emotional state of the customer as a function of the facial recognition analysis of the customer;

insert the video call into a service queue as a function of the probable emotional state of the customer, wherein the service queue comprises a plurality of video calls;

identify one or more facial features of the customer as a function of the facial recognition analysis of the customer; and determine a classification of the customer as a function of the identified one or more facial features, wherein to determine the probable emotional state of the customer comprises to determine the probable emotional state of the customer as a function of the classification of the customer.

11. The interaction management computing device of claim 10, wherein the one or more processors are further configured to execute the instructions to:

perform, subsequent to a determination that an agent is available to receive the video call inserted into the service queue, a facial recognition analysis of an agent based on images of a video stream captured of the agent;

determine a present emotional state of the agent as a function of the facial recognition analysis of the agent; and determine whether to transfer the video call to the agent as a function of the present emotional state of the agent.

12. The interaction management computing device of claim 11, wherein to determine whether to transfer the video call to the agent is further determined as a function of the probable emotional state of the customer.

13. The interaction management computing device of claim 10, wherein the one or more processors are further configured to execute the instructions to retrieve a customer interaction profile of the customer, wherein to determine whether to transfer the video call to the agent is further determined as a function of the historical information included in the customer interaction profile of the customer.

14. The interaction management computing device of claim 10, wherein the one or more processors are further configured to execute the instructions to:

transfer the video call from the service queue to an agent;

monitor an interaction between the customer and the agent; and determine one or more sentiment scores as a function of the monitored interaction between the customer and the agent.

15. The interaction management computing device of claim 14, wherein the one or more processors are further configured to execute the instructions to:

determine an updated emotional state of the customer as a function of the facial recognition analysis; and update one or more of the sentiment scores as a function of the updated emotional state of the customer.

16. The interaction management computing device of claim 14, wherein the one or more processors are further configured to execute the instructions to provide feedback to the agent as a function of the one or more of the sentiment scores, wherein the feedback is indicative of a present emotional state of the customer or the agent.

17. The interaction management computing device of claim 16, wherein to provide the feedback to the agent comprises to provide a visual indicator usable by the agent to perform an action, wherein the action includes at least one of changing an emotional state of the agent and escalating the call to a supervisor.

18. The interaction management computing device of claim 14, wherein the sentiment scores include an interaction score, an agent happiness score, and a customer happiness score.

* * * * *